Patented Mar. 17, 1936

2,033,934

UNITED STATES PATENT OFFICE 2,033,934

DEHUMIDIFYING SOLUTION

John J. Grebe, Sylvia M. Stoesser, and Forest R. Minger, Midland, Mich., assignors to The Dow Chemical Company, Midland, Mich., a corporation of Michigan No Drawing. Application August 24, 1934, Serial No. 741,346

6 Claims. (Cl. 252—25)

The invention relates to solutions suitable for dehumidifying air and other like gases; and particularly to a solution for use in air-conditioning apparatus in which the solution is to be reconcentrated after dilution caused by absorption of moisture during use.

Various hygroscopic solutions have been proposed for use in dehumidifying air. Among the most common are aqueous calcium chloride and sulphuric acid. In ordinary air-drying apparatus embodying a reconcentration system, the use of sulphuric acid is impractical from the standpoint of corrosion and inability to remove the sulphur trioxide fog formed during concentration. Aqueous calcium chloride solution is not entirely satisfactory because many industrial applications of air conditioning require a lower dew point in the treated air than can be obtained with even a saturated calcium chloride solution without cooling the same below atmospheric temperatures.

It is therefore an object of this invention to provide a dehumidifying solution which can be reconcentrated without decomposition, and which makes possible the drying of air in the low humidity range not covered by calcium chloride solutions. A saturated solution of calcium bromide has a much lower vapor pressure than a saturated solution of calcium chloride at the same temperature, and under the same conditions will therefore produce a lower dew point in air contacted therewith. Even so, calcium bromide solutions do not reduce the dew point of air dried therewith sufficiently in many cases.

We have now found that the solubility of calcium bromide in water is increased by calcium chloride and that of calcium chloride is increased by calcium bromide so that an aqueous solution containing both of these salts can be prepared having a much higher solute concentration than a saturated aqueous solution of either salt alone at the same temperature. As a result, solutions of the mixed salts can be prepared having a considerably lower aqueous tension than can be obtained with solutions of either salt alone at corresponding temperatures. We have found also that the incorporation in the solution containing calcium chloride and calcium bromide of other hygroscopic salts in amounts up to the limit of their solubility therein still further reduces the aqueous tension of the solution. Among the salts which are suitable for such use are nickel nitrate, the chlorides and bromides of magnesium, zinc, and manganese. The invention, then, consists of the features hereinafter fully described and particularly pointed out in the claims.

The following observations are illustrative of the effect of the chloride and bromide of calcium on the mutual solubilities of each in water and on the aqueous tension of the solutions thereof compared to that of a solution of either salt alone at corresponding temperatures. For example, at 90° F., 85 grams of calcium bromide dissolves in 47 grams of water to form a saturated solution, the aqueous tension of which is 5.4 mm. of mercury, and 15 grams of calcium chloride dissolves in 15 grams of water to form a saturated solution at the same temperature, the aqueous tension of which is 8.0 mm. Contrasted with these solubilities and aqueous tensions, we find that the aforesaid quantities of salts together dissolve in only 42 grams of water (compared to a total of 62 grams when separately dissolved) to form a solution which is saturated with respect to both salts. The aqueous tension of the saturated solution so obtained is about 3.1 mm. at 90° F., that is more than 42 per cent lower than the aqueous tension of a saturated solution of calcium bromide, and about 61 per cent lower than that of a saturated solution of calcium chloride at the same temperature.

At 90° F. the relative proportions of the salts expressed as the weights of the anhydrous compounds, $CaBr_2$, $CaCl_2$, which can be dissolved in the solution to saturate it with respect to both salts is 85 per cent and 15 per cent, respectively. When the proportion of calcium chloride is greater than 15 per cent and that of calcium bromide correspondingly less, solutions can be prepared which are saturated with respect to calcium chloride and unsaturated with respect to calcium bromide. Their aqueous tensions are lower than those of a saturated calcium bromide solution when the proportion of calcium chloride does not exceed about 62 per cent of the weight of both salts. When the proportion of calcium chloride is less than 15 per cent and greater than 1 per cent of the weight of both salts, then solutions can be prepared which are saturated with respect to calcium bromide and unsaturated with respect to calcium chloride and their aqueous tensions are also lower than that of saturated calcium bromide solutions at the same temperature.

A further illustration of proportions of the two salts, the solution of which possesses a lower aqueous tension than that of a saturated solution of either salt alone, may be had by dissolving the two salts in water at 40° F., for example. A solution of calcium bromide saturated at 40° F. has an aqueous tension of about 9.6 mm. at 90° F., and a solution of calcium chloride saturated at 40° F. has an aqueous tension of about 17.3 mm. at 90° F. The two salts together in the proportions of 16 per cent of calcium chloride and 84 per cent of calcium bromide (expressed on a dry basis) form a solution which is saturated with respect to both salts at 40° F. and has an aqueous tension of about 8.9 mm. at 90° F. When the proportion of calcium chloride is greater than 16 per cent and that of calcium bromide correspondingly less, the solution may be saturated with respect to calcium chloride and unsaturated with respect to calcium bromide, and for a calcium chloride proportion up to 27 per cent (73 per cent CaBr₂), the solutions have an aqueous tension of less than 9.6 mm. at 90° F. When the proportion of calcium chloride is less than 16 per cent and greater than 1 per cent, solutions may be prepared which are saturated with respect to calcium bromide and unsaturated with respect to calcium chloride, and the aqueous tensions of such solutions measured at 90° F. are also lower than 9.6 mm.

Thus, we have found that at any given temperature ordinarily encountered in air dehumidification, a range of proportions of calcium chloride to calcium bromide exists over which solutions can be prepared having a lower aqueous tension than a saturated aqueous solution of either salt alone at like temperature. Furthermore, for each temperature there is one proportion between the limits of the range thereof in which the solution is saturated with respect to both salts. Such a solution, when saturated, is termed a congruently saturated solution and possesses the lowest aqueous tension of any that can be prepared from the two salts at corresponding temperatures.

For the preparation of the solutions the anhydrous salts or salts containing water of crystallization may be used, and after dissolving in water the solution may be concentrated if necessary or desirable by evaporation to attain the desired degree of water concentration. It is generally preferable to employ the salt mixtures in as nearly saturated solution as possible.

In the tables I and II compositions are given of calcium chloride-calcium bromide solutions saturated at 40° F. and 90° F., respectively, together with the values of their aqueous tensions, and the dew point of air in equilibrium with the solutions at 90° F.

Table I

| Composition of solution in grams of anhydrous salt per 100 grams of solution saturated at 40° F. | | Aqueous tension at 10° F. in mm. of mercury | Dew point in °F. of air in equilibrium with the solution at 90° F. |
| --- | --- | --- | --- |
| CaCl₂ | CaBr₂ | | |
| 38* | None | 17.3 | 68.0 |
| 14* | 37 | 9.5 | 51.1 |
| 9* | 45* | 8.9 | 49.3 |
| 5 | 50* | 9.2 | 50.2 |
| 1 | 55* | 9.5 | 51.1 |
| None | 56* | 9.6 | 51.4 |

* Solution is saturated with respect to the salt at the head of the column.

Table II

| Composition of solution in grams of anhydrous salt per 100 grams of solution saturated at 90° F. | | Aqueous tension at 90° F. in mm. of mercury | Dew point in °F. of air in equilibrium with the solution at 90° F. |
| --- | --- | --- | --- |
| CaCl₂ | CaBr₂ | | |
| 51* | None | 8.0 | 46.6 |
| 35* | 23 | 5.4 | 36.1 |
| 22* | 36 | 4.0 | 29.3 |
| 11* | 59* | 3.1 | 23.5 |
| 4 | 62* | 4.4 | 31.1 |
| 1 | 63* | 5.4 | 36.1 |
| None | 64* | 5.5 | 36.7 |

* Solution is saturated with respect to the salt at the head of the column.

It will be understood that these and other compositions hereinbefore given by way of illustration are not to be regarded as limiting the invention inasmuch as will be seen by comparing the data in the two tables, that the effective proportions vary with the temperature. The effective proportions, however, are limited to those at which the saturated solutions exhibit a lower aqueous tension than that of a saturated aqueous solution of either salt alone at corresponding temperatures. The aqueous tensions of saturated solutions of the single salts are given in the tables for comparison as well as the dew point of air in equilibrium with the solutions computed from the aqueous tension thereof compared to that of pure water at the same temperature.

In addition to possessing a lower aqueous tension than saturated solutions of either salt alone, our solutions have the advantage that, in contrast with ordinary saturated calcium chloride solutions, they do not cake solidly upon cooling slightly below the temperature at which the solution is saturated, but rather deposit fine crystals which remain in suspension. This is a distinct advantage since the apparatus does not become plugged should the temperature fall below the saturation point. These solutions also do not hydrolyze to any significant extent; they are odorless and the solute is non-volatile. Therefore, they may be used for long periods of time in suitable dehumidifying apparatus without damage thereto or contamination of the air or other like gas in contact with the solution.

Other hygroscopic salts, such as the bromide and chloride of magnesium, manganese, and zinc, nickel nitrate, etc., may be dissolved in calcium chloride-calcium bromide solution to produce a solution having a still lower aqueous tension. For example, a solution containing 53.2 grams of CaBr₂, 6.2 grams of CaCl₂, 5.0 grams of MgBr₂, and 5.0 grams of ZnCl₂ per 100 grams of solution has a saturation point of 71.5° F. and the aqueous tension at this temperature is about 2.1 mm. of mercury. Compared to this solution at the same temperature a saturated solution of calcium chloride and a saturated solution of calcium bromide have aqueous tensions of about 6.6 mm. and 3.7 mm., respectively.

Among the advantages possessed by our new dehumidifying solutions are (1) air and like gas now can be dried by means of aqueous solutions to a much lower relative humidity than could be obtained heretofore by known salt solutions without cooling the same below atmospheric temperatures; (2) our solution can be repeatedly or continuously reconcentrated without decomposition or significant loss of solute; (3) the solutions do not cake solidly upon cooling slightly below the saturation point as do ordinary calcium chloride solutions.

This application is a continuation-in-part of our copending application Serial No. 661,788, filed March 20, 1933.

Other modes of applying the principle of our invention may be employed instead of the one explained, change being made as regards the materials employed, provided the ingredients stated by any of the following claims or the equivalent of such stated ingredients be employed.

We therefore particularly point out and distinctly claim as our invention:—

1. A composition of matter comprising calcium chloride and calcium bromide in proportions such that a saturated aqueous solution thereof has a lower aqueous tension than a saturated aqueous solution of calcium bromide at like temperature.

2. A composition of matter comprising an aqueous solution containing the bromide and chloride of calcium in proportions such that the aqueous tension thereof is lower than that of a saturated aqueous solution of calcium bromide at like temperature.

3. A composition of matter comprising an aqueous solution, the solute of which contains calcium chloride and calcium bromide in the proportions of from 1 to 35 parts of calcium chloride and from 63 to 23 parts of calcium bromide per 100 parts of solution.

4. A composition of matter comprising an aqueous solution, the solute of which contains calcium chloride and calcium bromide in the proportions of 22 to 4 parts of calcium chloride and from 36 to 62 parts of calcium bromide per 100 parts of solution.

5. A composition of matter comprising an aqueous solution containing calcium chloride and calcium bromide in proportions between $$\frac{1 CaCl_2}{99 CaBr_2} \text{ and } \frac{27 CaCl_2}{73 CaBr_2}$$

by weight.

6. A composition of matter comprising an aqueous solution containing calcium chloride and calcium bromide in proportions between $$\frac{1 CaCl_2}{99 CaBr_2} \text{ and } \frac{27 CaCl_2}{73 CaBr_2}$$

by weight, containing other hygroscopic salts capable of lowering the aqueous tension of the solution.

JOHN J. GREBE.
SYLVIA M. STOESSER.
FOREST R. MINGER.

---

CERTIFICATE OF CORRECTION.

Patent No. 2,033,934.　　　　　　　　　　　　　　　　　　March 17, 1936.

JOHN J. GREBE, ET AL.

It is hereby certified that error appears in the printed specification of the above numbered patent requiring correction as follows: Page 2, first column, line 45, second column of Table I, for "10° F." read 90° F.; and that the said Letters Patent should be read with this correction therein that the same may conform to the record of the case in the Patent Office.

Signed and sealed this 9th day of June, A. D. 1936.

Leslie Frazer

Acting Commissioner of Patents.

(Seal)

CERTIFICATE OF CORRECTION.

Patent No. 2,033,934. March 17, 1936.

JOHN J. GREBE, ET AL.

It is hereby certified that error appears in the printed specification of the above numbered patent requiring correction as follows: Page 2, first column, line 45, second column of Table I, for "10° F." read 90° F.; and that the said Letters Patent should be read with this correction therein that the same may conform to the record of the case in the Patent Office.

Signed and sealed this 9th day of June, A. D. 1936.

Leslie Frazer (Seal) Acting Commissioner of Patents.